United States Patent
Wolf, Sr. et al.

(10) Patent No.: US 7,588,051 B2
(45) Date of Patent: Sep. 15, 2009

(54) ROTARY VALVE DEVICE

(76) Inventors: Donald M. Wolf, Sr., 6218 Sale Ave., Woodland Hills, CA (US) 91367; Mark J. Wolf, 19545 Sherman Way, #60, Reseda, CA (US) 91335; Anthony J. Caterina, 22190 Dogie Pl., Canyon Lake, CA (US) 92587

( * ) Notice: Subject to any disclaimer, the term of this patent is extended or adjusted under 35 U.S.C. 154(b) by 545 days.

(21) Appl. No.: 11/243,075

(22) Filed: Oct. 3, 2005

(65) Prior Publication Data

US 2007/0246109 A1 Oct. 25, 2007

(51) Int. Cl.
*F16K 11/074* (2006.01)
(52) U.S. Cl. .................... 137/625.21; 251/368
(58) Field of Classification Search ........... 137/625.21; 251/368
See application file for complete search history.

(56) References Cited

U.S. PATENT DOCUMENTS

| | | | | |
|---|---|---|---|---|
| 1,447,285 A * | 3/1923 | Dollin | ............... | 137/625.21 |
| 2,079,041 A * | 5/1937 | Ryan et al. | ............... | 137/625.21 |
| 2,477,590 A * | 8/1949 | Ferwerda et al. | ....... | 137/625.21 |
| 2,567,428 A * | 9/1951 | Greeley | ............... | 137/625.21 |
| 2,744,540 A * | 5/1956 | Erle | ............... | 137/625.21 |
| 2,852,040 A * | 9/1958 | Deardorff | ............... | 137/625.21 |
| 2,917,080 A * | 12/1959 | Hatch | ............... | 137/625.21 |
| 2,986,167 A * | 5/1961 | Griswold et al. | ....... | 137/625.21 |
| 3,875,967 A * | 4/1975 | deFries | ............... | 137/625.21 |
| 4,351,362 A * | 9/1982 | Solie et al. | ............... | 137/625.21 |
| 4,505,184 A * | 3/1985 | McDonald | ............... | 137/625.23 |
| 4,964,433 A * | 10/1990 | Marietta | ............... | 137/625.21 |
| 5,353,838 A * | 10/1994 | Grant | ............... | 137/625.21 |
| 5,393,014 A * | 2/1995 | Weisend, Jr. et al. | ... | 137/625.21 |
| 5,934,320 A * | 8/1999 | O'Reilly et al. | ........ | 137/625.21 |
| 6,152,176 A * | 11/2000 | Lin | ............... | 137/625.21 |

\* cited by examiner

*Primary Examiner*—John Rivell
(74) *Attorney, Agent, or Firm*—Frederick Gotha

(57) ABSTRACT

This invention relates to a rotary valve device for controlling and distributing flow of a fluid medium directly in response to the rotary motion of a motor shaft. Fluid medium is continuously supplied to a cavitated disk through a manifold by a pump source where the cavitated disk rotates at the same rotational speed as the motor shaft. The cavitated disk has a first void region in continuous fluid communication with the pump source and alternately communicates with cylinder conduits to drive a piston. A second void region in the cavitated disk is so dimensioned and proportioned to permit fluid medium to be alternately exhausted from the cylinder and to be distributed to exhaust conduits and then to the atmosphere. The cavitated disk is positioned a pre-selected distance from the manifold so as to permit the cavitated disk to rotate on an air cushion between the cavitated disk and manifold which reduces friction and energy losses and permits the device to translate a wide range of rotary motion of a motor into linear cyclical motion of a piston.

14 Claims, 7 Drawing Sheets

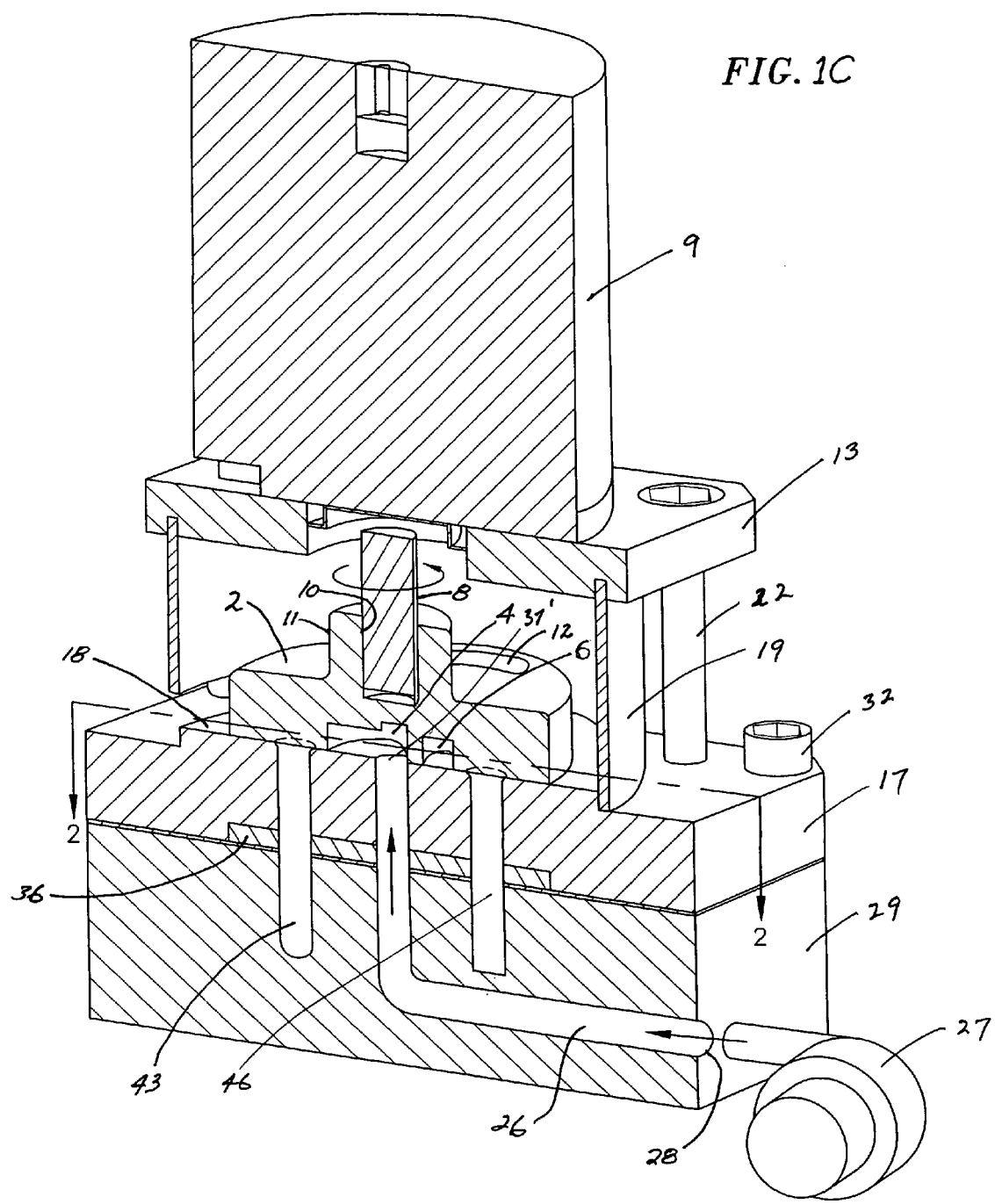

ROTARY VALVE DEVICE

FIELD OF THE INVENTION

This invention relates to a rotary valve device that translates the rotary motion of a motor into the linear reciprocating movement of a piston having the same frequency as the motor.

BACKGROUND OF THE INVENTION

In the translation of the rotary motion of a motor to linear reciprocal motion of a piston, inertial and frictional forces are encountered that limit the response time of the valve during motor start and stop. It is desirable to have a rotary valve that has a lightweight rotatable cavitated disk to reduce inertial effects for rapid stops and starts and for translating the rotary action of the shaft of a motor over a broad range of frequencies into the reciprocating action of a piston with minimum loss of energy. A lightweight rotary cavitated disk coupled directly to the motor shaft, dynamically balanced, and rotating on an air bearing or air cushion substantially reduces inertial effects and frictional losses and permits the valve to accelerate to the rated motor speed in milliseconds after start and accordingly achieve in phase reciprocating motion of a piston with the same frequency as the motor. It is also desirable that the rotary valve efficiently distribute fluid medium and communicate with the cylinder containing the piston for both the intake and exhaust of fluid by having one pressure port for supplying fluid under pressure to the cavitated disk, a first and second cylinder conduit communicating with the pressure port, and a first and second exhaust ports that alternately communicate with cylinder ports such that the valve can be operated in two-way, three-way, or four-way configurations by connecting fluid lines only to the ports needed for the selected operation.

It is therefore an object of the present invention to provide a rotary valve device to translate the rotation of a motor shaft into the reciprocating motion of a piston with minimum loss of energy.

A more specific object of this invention is to provide a lightweight rotary cavitated disk which is directly coupled to a motor shaft and rotates on an air bearing where the bottom surface of the cavitated disk is located at a pre-determined distance from the planar surface of a manifold where a fluid medium under pressure is continuously delivered to the manifold and distributed by the cavitated disk for cyclically driving a piston and exhausting the fluid medium to the atmosphere.

SUMMARY OF THE INVENTION

There is, therefore, provided in accordance with the present invention a motor driven rotary valve device utilizing fluid supplied under pressure from a pump to translate the rotary motion of the motor shaft into the linear cyclic motion of a piston. The rotary valve device is composed of a base plate which carries the motor, a manifold member that is mounted in fixed spatial relationship to the base plate and a cavitated disk carried by the motor shaft. The cavitated disk is carried in fixed rotational relationship with the motor shaft and has a lower surface that is positioned at a pre-selected axial distance from and parallel to a facing planar surface of the manifold member. Fluid is continuously delivered under pressure to a pressure conduit in the manifold member by the pump and the pressure conduit communicates with a first void region in the lower surface of the cavitated disk where the first void region is so dimensioned and proportioned to permit fluid distribution alternately into first and second cylinder conduits with each cycle of revolution of the cavitated disk. Both the first cylinder conduit and the second cylinder conduit communicate with a cylinder chamber so as to permit the piston within the cylinder chamber to be reciprocally driven as the fluid is supplied under pressure alternatively during each cycle of the motor through the first and second cylinder conduits.

To enable fluid to cyclically exhaust from the cylinder chamber, the cavitated disk has a second void region contained in the lower surface of the cavitated disk where the second void region is so dimensioned and proportioned to permit fluid communication between the first cylinder conduit and the second void region when the second cylinder conduit is in communication with the first void region and to permit fluid communication between the second void region and second cylinder conduit when the first cylinder conduit is in fluid communication with the first void region. The manifold member contains a first exhaust conduit and a second exhaust conduit for exhausting the fluid to the atmosphere. When the first exhaust conduit is in fluid communication with the first cylinder conduit, the second cylinder conduit will be in fluid communication with the first void region; and when the second exhaust conduit is in fluid communication with the second cylinder conduit, the first cylinder conduit will be in fluid communication with the first void region. During each cycle, the second void region communicates with the first and second cylinder conduits and the first and second exhaust conduits, respectively, thereby permitting fluid to exhaust from the cylinder chamber through a cylinder conduit to an exhaust conduit while at the same time fluid under pressure is distributed through a cylinder conduit and into the cylinder chamber to drive the piston.

BRIEF DESCRIPTION OF THE DRAWINGS

These and other features and advantages will become appreciated as the same become better understood with reference to the following specification, claims and drawings wherein:

FIG. 1C is a cross-sectional perspective view of the assembly of the rotary valve device illustrated in FIGS. 1 and 1A.

DETAILED DESCRIPTION

Figure 1:
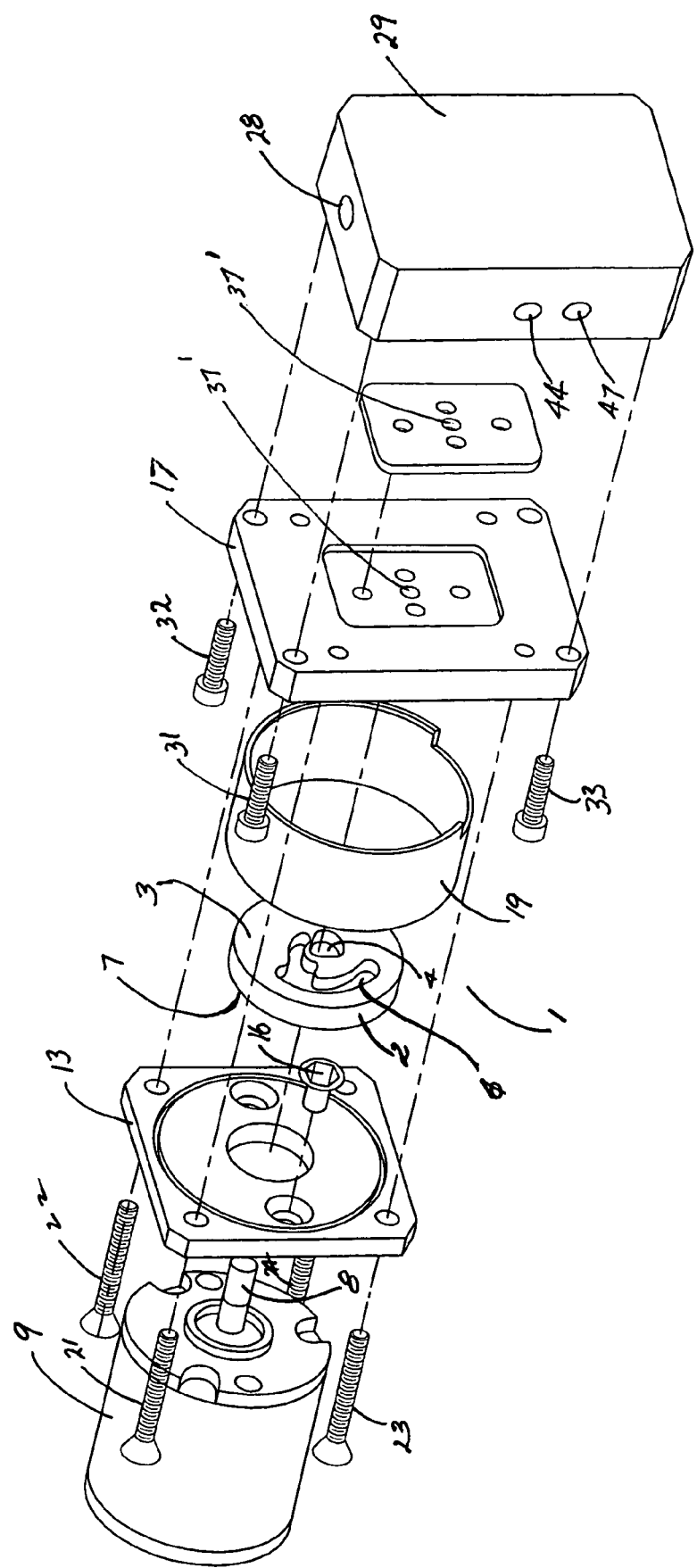
FIG. 1 is an exploded perspective view illustrating the rotary valve device of this invention.

FIG. 1 is an exploded perspective view of the rotary valve 1 of this invention illustrating the part members and their relative location to adjoining part members prior to assembly. A reverse exploded perspective view of rotary valve 1 is shown in FIG. 1A to illustrate the front and rear configurations of the part member surfaces.

Figure 1A:
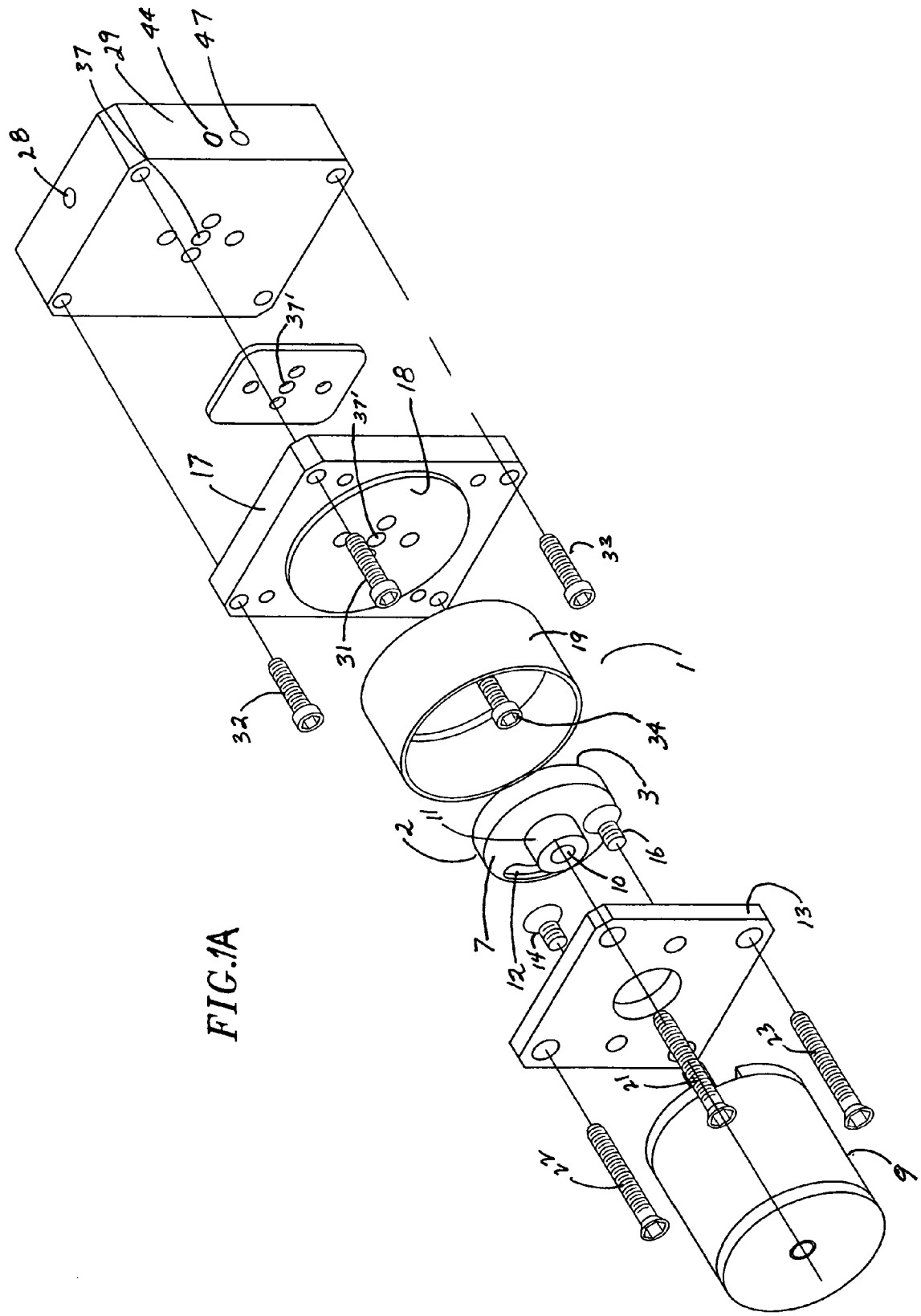
FIG. 1A is an exploded reverse perspective view of the rotary valve device shown in FIG. 1.
Figure 1B:
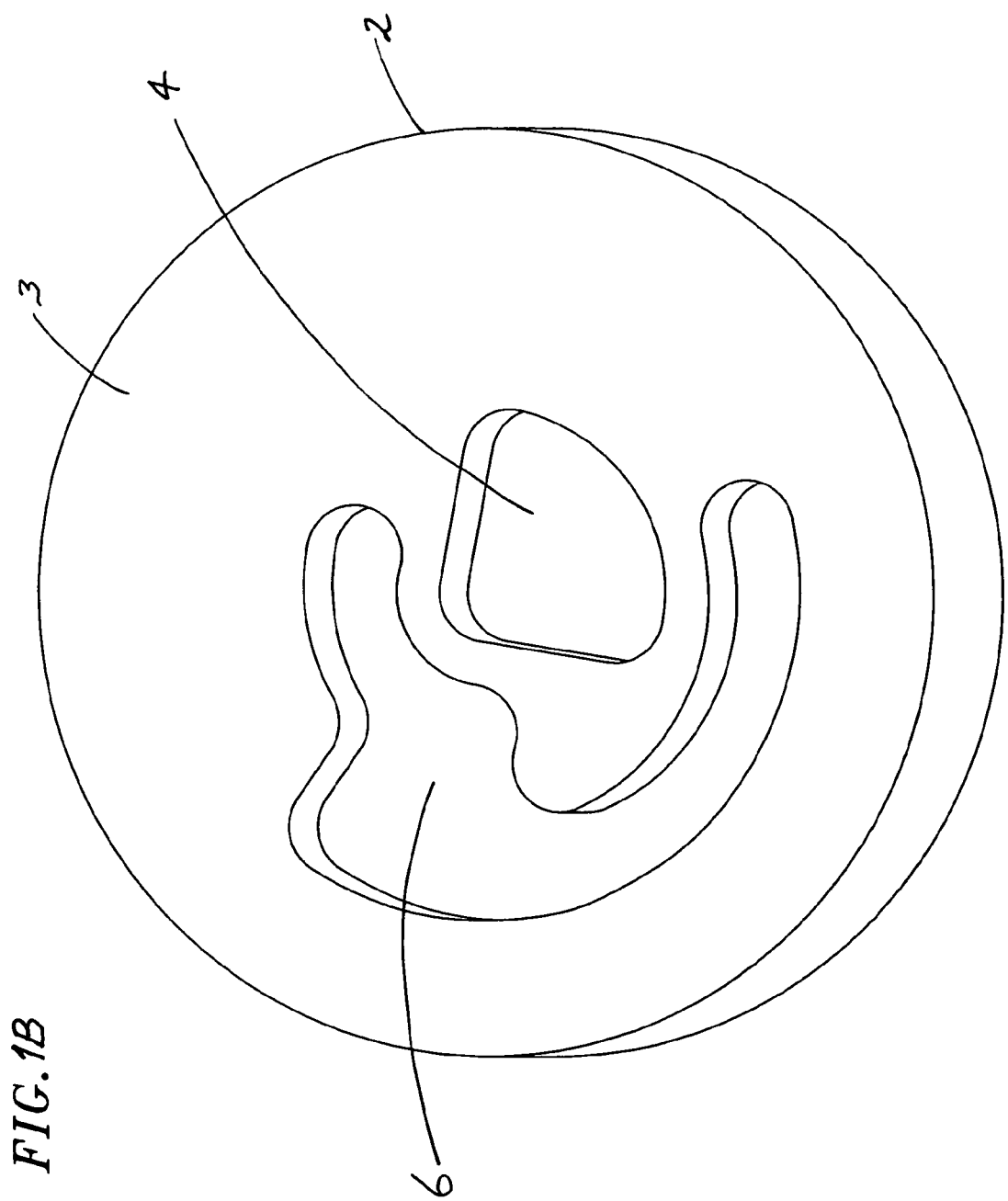
FIG. 1B is an enlarged perspective view of the frontal portion of the rotary cavitated disk illustrated in FIG. 1.

Referring to FIG. 1 and FIG. 1B, it can be seen that cavitated disk 2 has a lower surface 3 containing a first void region 4 and a second void region 6. First void region 4 has the shape of a sector of a circle, or pie shape, with the center of the sector substantially collinear with the axis of rotation of cavitated disk 2. The purpose of these void regions is to permit alternating distribution of, and exhaust of, fluid flow to and from a cylinder which houses a piston. First and second void regions 4 and 6 are more clearly shown in FIG. 1B which is a magnified view of the lower surface 3 of cavitated disk 2. As can be seen by reference to FIG. 1, FIG. 1A, and FIG. 1B, first and second void regions 4 and 6 are open cavities in lower surface 3 and have a pre-determined geometrical configuration and depth; the voids are bounded by and do not have openings in the upper surface 7 of cavitated disk 2. Each of the configurations of void regions 4 and 6 is so proportioned and dimensioned such that fluid delivered under pressure from a pump source may be cyclically distributed through fluid communication conduits to drive a piston. The interrelationship and operation of cavitated disk 2 in conjunction with void regions 4 and 6 will be more particularly described hereafter by reference to FIG. 1C, which is a cross section of the assembly of parts illustrated in FIGS. 1 and 1A, and by reference to FIGS. 2, 3, 4, and 5.

Referring again to FIG. 1 and FIG. 1A, cavitated disk 2 is carried in fixed rotational relationship with motor shaft 8 of motor 9. The upper surface 7 of cavitated disk 2 has a cylindrical extension 11 containing a bore 10 therein where bore 10 is adapted for receiving motor shaft 8 and for captively holding cavitated disk 2 in fixed relationship with the shaft. Cavitated disk 2 is dynamically balanced by the mass void cavity 12 located in upper surface 7 which is illustrated in FIG. 1A. Rotary valve 1 of this invention is designed to operate at very low to very high speeds which will depend upon the drive motor chosen. Motor speeds may range up to 15,000 cycles per minute; the structure described herein of rotary valve 1 is designed translate the rotary action frequency of the motor shaft into equivalent linear cyclic motion of a piston.

As can be seen in FIG. 1A, motor 9 is mounted to motor mounting plate 13 by fasteners 14 and 16. By reference to FIG. 1C it can further be seen that manifold base 17 is carried by motor mounting plate 13 at a pre-determined axial distance such that the displacement between the lower surface 3 and the planar surface 16 may be selectively adjusted to a pre-determined distance between the surfaces. Although the planar surface 18 is shown in FIG. 1A to be the surface of a raised cylindrical cavitated disk, the planar surface whether raised or an integral surface of the manifold base 17 functions in the same way. The cylindrical cavitated disk surface shown as planar surface 18 is raised to accommodate wall tube 19 which encloses the space between motor mounting plate 13 and manifold base 17. As can further be seen in FIGS. 1 and 1A, the manifold base 17 is attached to the motor mounting plate 13 by fasteners 21, 22, 23, and 24, and the axial distance separating planar surface 18 and motor mounting plate 13 may be adjusted to establish a void space having a pre-selected axial dimension between the cavitated disk lower surface 3 and planar surface 18. The void space between the planar surface and lower surface of the cavitated disk 2 provides an air cushion or air bearing between surfaces that substantially minimizes frictional losses in the operation of rotary valve 1. By reference to FIG. 1C which is a cross-sectional perspective view of the rotary valve, the operational relationship between the rotary action of cavitated disk 2 and manifold base 17 with fluid supplied under pressure from a pump 27 can be more definitively understood.

Referring to FIG. 1C, fluid, preferably air, is supplied to pressure conduit 26 by pump 27. The fluid is supplied continuously under pressure from pump 27 through intake port 28 into pressure conduit 26 which communicates with first void region 4 of cavitated disk 2. Intake port 28 is located in manifold 29 and the manifold is fastened to manifold base 17 by manifold fasteners 31, 32, 33, and 34. As can be seen by reference to FIGS. 1 and 1A, manifold gasket 36 is juxtaposed between manifold 29 and manifold base 17. Although the embodiment shown in FIG. 1C illustrates manifold base 17 having manifold gasket 36 captively compressed and bearing between manifold base 17 and manifold 29, a single structure that incorporated the manifold base and gasket into the manifold would function in essentially an identical manner and is an alternative embodiment although not shown.

Figure 2:
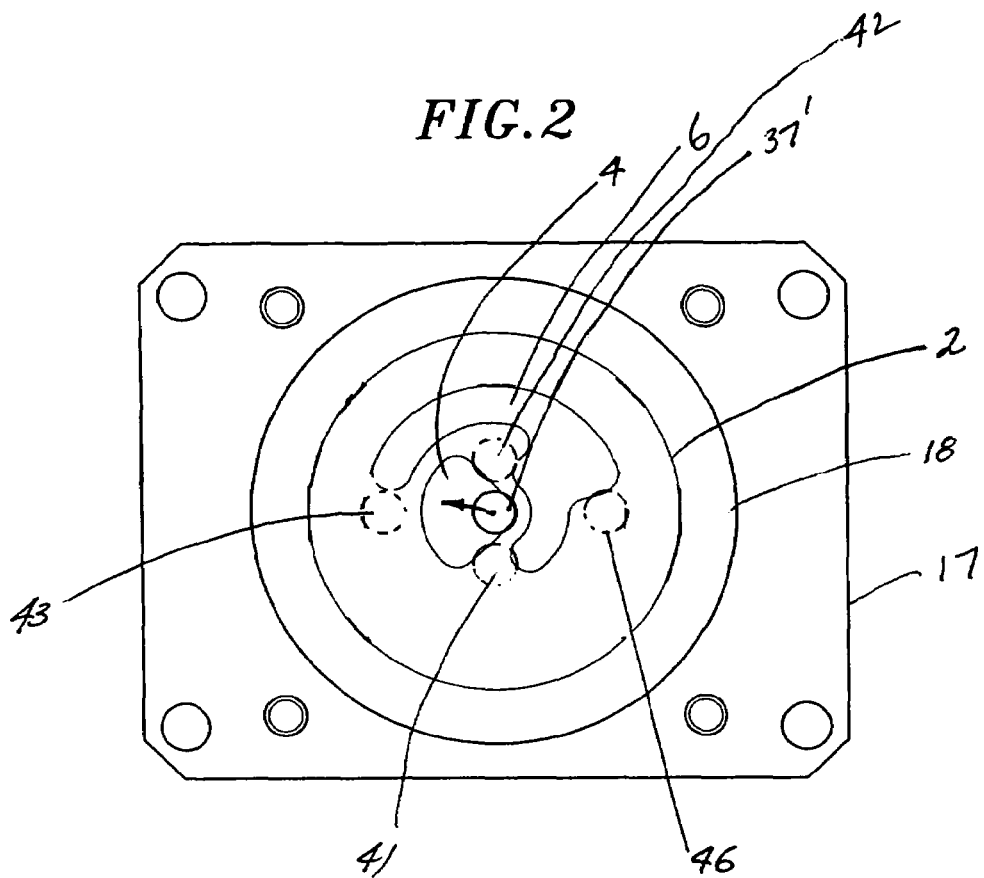
FIG. 2 is a view along the line 2-2 of FIG. 1C illustrating the rotary cavitated disk at the beginning of a cycle of revolution of the rotary valve.
Figure 3:
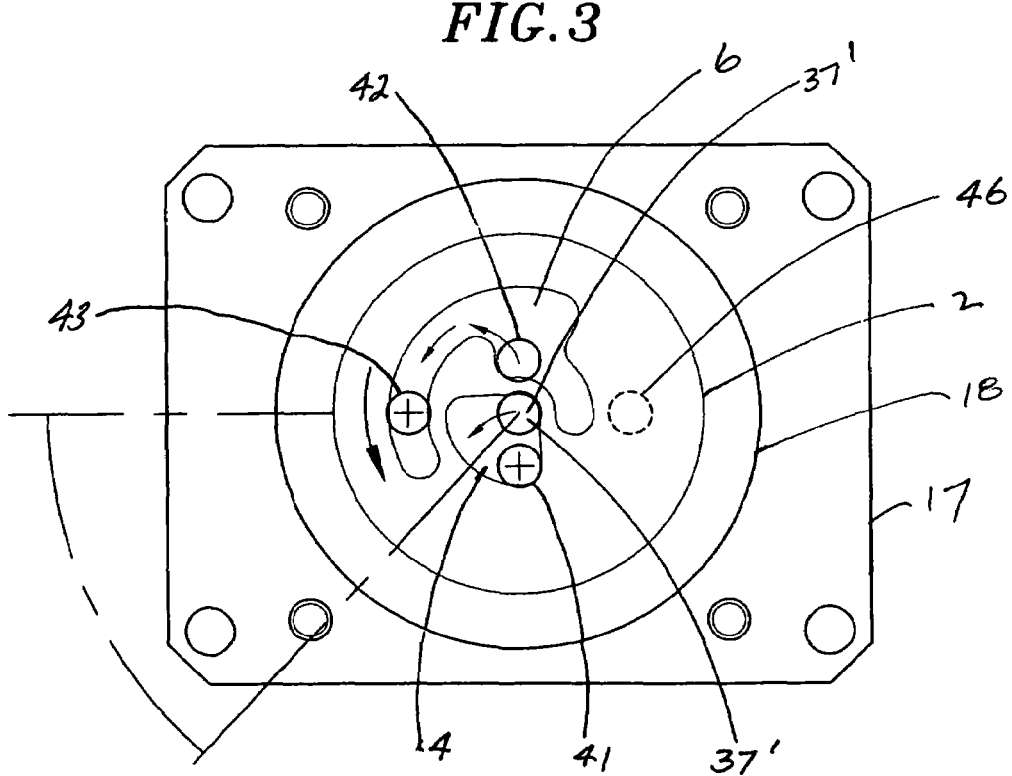
FIG. 3 is a view along the line 2-2 of FIG. 1C illustrating the rotary cavitated disk having rotated through an initial angular displacement in a cycle of rotation.
Figure 4:
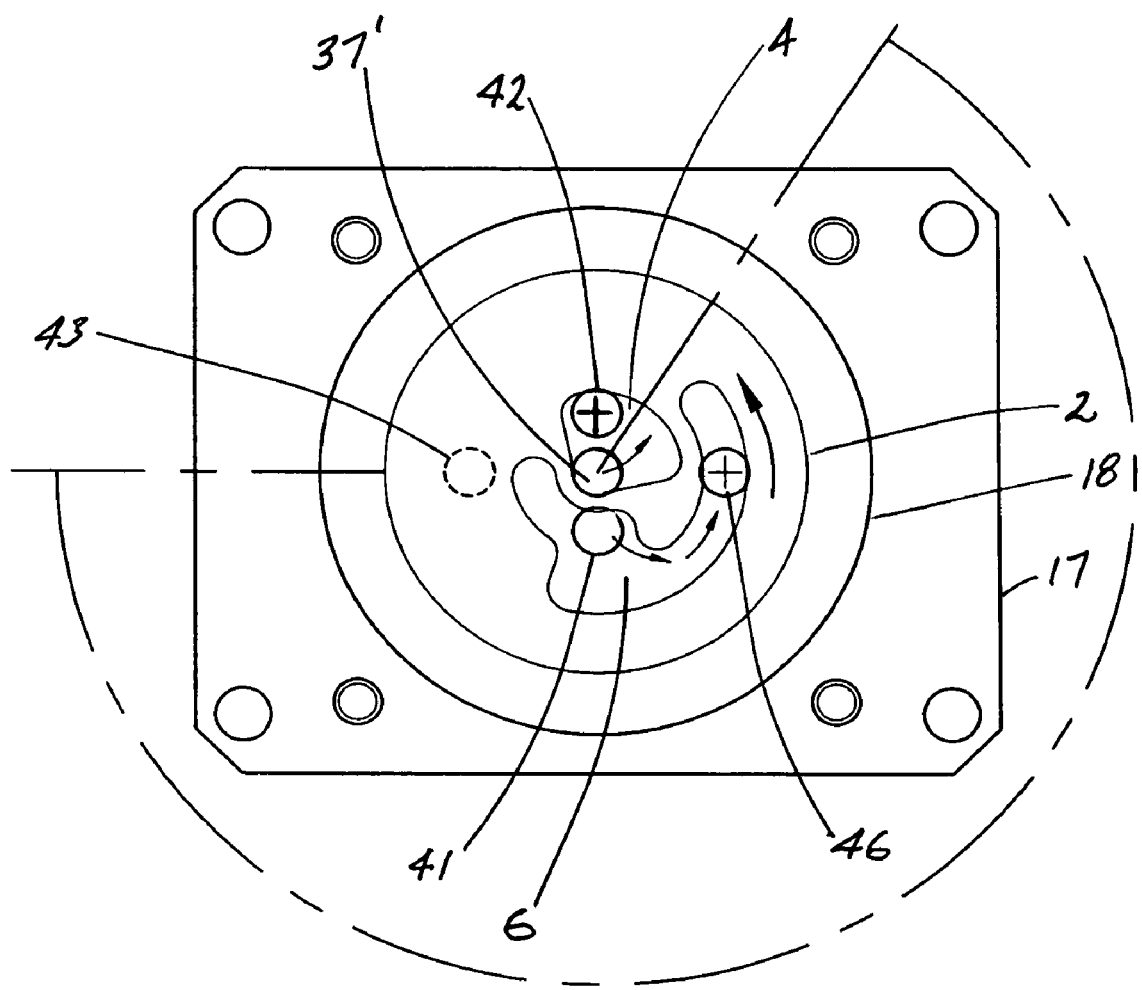
FIG. 4 is a view along the line 2-2 of FIG. 1C illustrating the rotary cavitated disk having further rotated angularly from FIG. 3 within a cycle of rotation.
Figure 5:
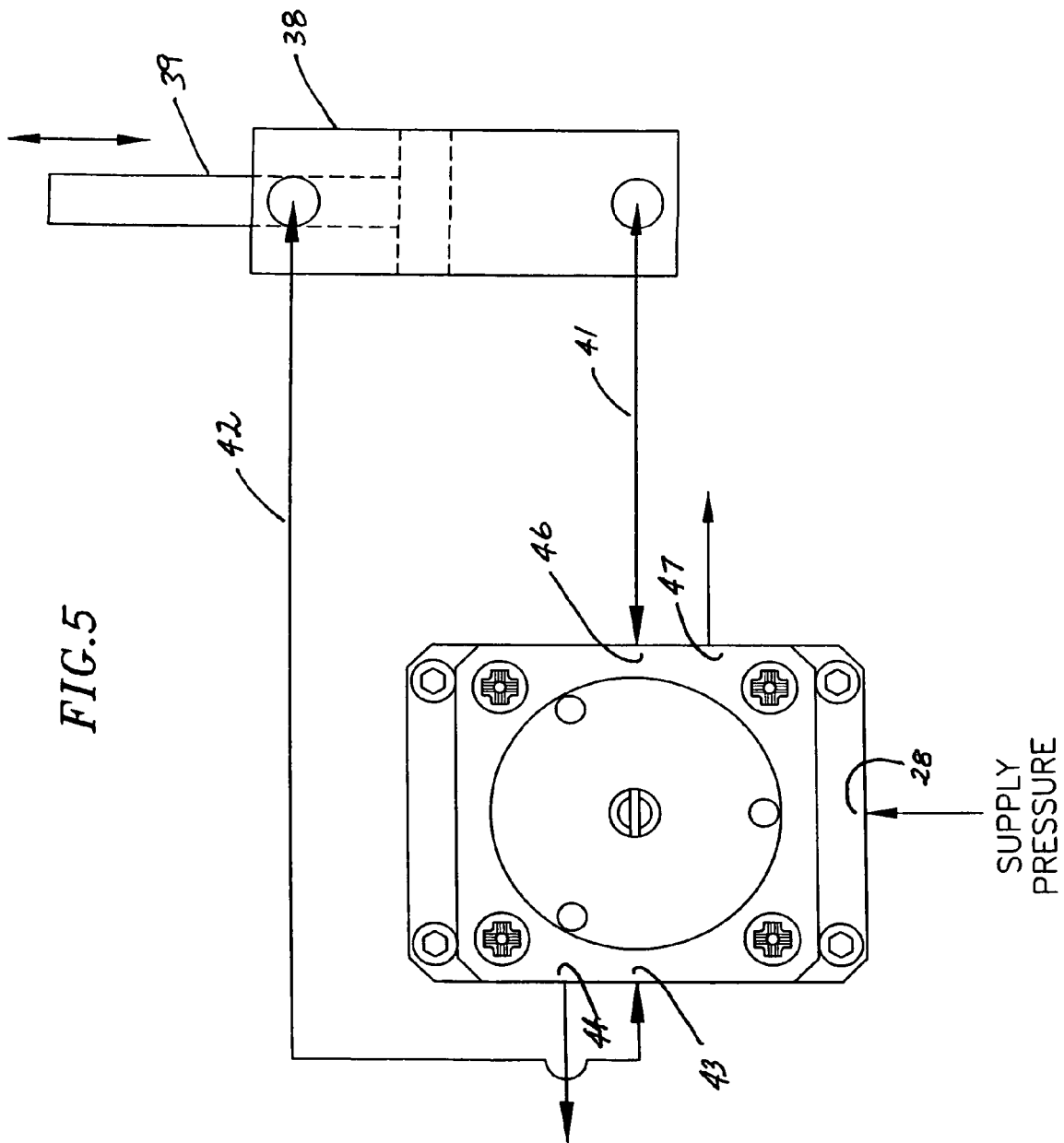
FIG. 5 is a schematic illustration of the rotary valve device, cylinder, and piston in operative cooperation.

As the pressurized fluid approaches first void region 4 it is distributed through distribution ports 37 and 37'into void region 4 which is rotating with the angular speed of the motor shaft 8. FIGS. 2, 3, and 4 are directional views along the line 2-2 of FIG. 1C and illustrate fluid flow as cavitated disk 2 rotates. By referring to FIG. 2, which shows an initial position of cavitated disk 2, and by reference to FIG. 1C, it can be seen that fluid enters into first void region 4 through distribution port 37'where distribution port 37'is surrounded by first void region 4 and is in continuous fluid communication with pressure conduit 26 such that the fluid medium continually flow into void region 4 as cavitated disk 2 rotates. As cavitated disk 2 continues to rotate as shown in FIG. 3, both first void region 4 and second void region 6 are angularly displaced thereby covering and uncovering conduits which communicate with manifold 29 to deliver intake fluid to and to provide an exhaust passage for fluid from cylinder 38. By referring to FIG. 5, (which schematically demonstrates fluid flow to and from cylinder 38 and the exhaust of fluid to the atmosphere from manifold 29) and to FIGS. 2, 3, and 4, the operation of the piston and fluid flow into and exhausting form the cylinder, can more readily be understood. When cavitated disk 2 is in the position shown in FIG. 3, fluid enters cylinder 38 through cylinder conduit 41 and is exhausted through cylinder conduit 42 by piston 39 into second void region 6 which communicates with both cylinder conduit 42 and first exhaust conduit 43. Thus, as intake fluid enters cylinder 38 through cylinder conduit 41, piston 39 moves in response to the fluid pressure while at the same time forcing fluid to exhaust through cylinder conduit 42. Cylinder conduit 42 communicates with second void region 6 which communicates with first exhaust conduit 43 and first exhaust port 44 thereby providing an exhaust flow path through the manifold to the atmosphere.

The continued rotation of cavitated disk 2 as shown in FIG. 4 permits fluid under pressure to now enter into cylinder 38 through cylinder conduit 42 which reverses the movement of piston 39. It can be seen by reference to FIG. 4 and FIG. 5 that intake fluid entering cylinder 38 through cylinder conduit 42 will pressurize piston 39 such that in response to the fluid pressure, piston 39 will now act to exhaust fluid through cylinder conduit 41 into void region 6 where the fluid thereafter exhausts through second exhaust conduit 46 to the atmosphere through second exhaust port 47.

Since motor shaft 8 is coupled directly to cavitated disk 2, the rotary valve will translate the cyclic rotation of motor shaft in the linear cyclical action of piston 39 in milliseconds. The axial displacement between lower surface 3 of cavitated disk 2 and planar surface 18 permits fluid entering first void region 4 to crate an air cushion between the surface and thus substantially minimizing fictional losses during operation of the valve.

While a rotary valve device has been shown and described having certain embodiments, it is to be understood that the invention is subject to many modification without departing form the scope and spirit of the claims as recited herein.

The invention claimed is:

1. A motor driven rotary valve device utilizing a fluid medium supplied under pressure from a pump to translate the frequency of rotation of a motor shaft carried by and driven by said motor into the rectilinear frequency of a piston contained in a cylinder, comprising:
   (a) a base plate carrying said motor;
   (b) valve means carried by said base plate for controlling and distributing flow of said fluid medium directly in response to said frequency of rotation of said motor shaft where said valve means comprises a cavitated disk having an upper surface, a lower surface, and an axis of rotation carried by said motor shaft in fixed rotational relationship therewith, said cavitated disk further having an open first void cavity region disposed in said lower surface, said open first void cavity region having the shape of a sector of a circle where said axis of rotation and the center of said sector of a circle are substantially collinear;
   (c) manifold means for distributing said fluid medium to said valve means from said pump and for distributing said fluid medium to said cylinder to reciprocate said piston at said rectilinear frequency, where said manifold means comprises a distribution port in continuous fluid communication with said pump and said open first void cavity region, and where said distribution port is surrounded by said open first void cavity region and positioned adjacent said center of said sector of a circle to permit continuous flow of said fluid medium into said sector of a circle during rotation of said cavitated disk.

2. The motor driven rotary valve device recited in claim 1 wherein said manifold means includes a manifold member having a planar surface carried by said base plate, said manifold member further having a pressure conduit for passage of said fluid medium, where said pressure conduit is in continuous fluid communication with said pump and said distribution port.

3. The motor driven rotary valve device recited in claim 2 wherein said manifold member has a first cylinder port and a second cylinder port radially opposite and equally spaced from said distribution port to permit flow of said fluid medium to said cylinder when said first or second cylinder port is in fluid communication with said distribution port and to permit said fluid medium to exhaust from said cylinder when said first or second cylinder port is not in fluid communication with said distribution port.

4. The motor driven rotary valve device recited in claim 3 wherein said manifold member further has first and second exhaust conduits where said first exhaust conduit is in fluid communication with said first cylinder port and said second exhaust conduit is in fluid communication with said second cylinder port for exhausting said fluid medium to the atmosphere.

5. The motor driven rotary valve device recited in claim 4 wherein said cavitated disk has an open second void cavity region so disposed in said lower surface and so dimensioned and proportioned such that when said open second void cavity region is in fluid communication with said first cylinder port, said first exhaust conduit is in fluid communication with said open second void cavity region, and when said open second void cavity region is in fluid communication with said second cylinder port, said second exhaust conduit is in fluid communication with said open second void cavity region.

6. The motor driven rotary valve device recited in claim 1 wherein said upper surface of said cavitated disk has a cavity therein so dimensioned and proportioned to dynamically balance said cavitated disk.

7. The motor driven rotary valve device recited in claim 2 wherein said lower surface and said planar surface are sufficiently adjacent surfaces to permit said lower surface to be in a bearing relationship with said fluid during rotation of said cavitated disk.

8. The motor driven rotary valve device recited in claim 1 wherein said cavitated disk is made of a lightweight material.

9. The motor driven rotary valve device recited in claim 8 wherein said lightweight material is aluminum.

10. A motor driven rotary valve device utilizing a fluid medium supplied under pressure from a pump to translate the frequency of rotation of a motor shaft carried by and driven by said motor into the rectilinear frequency of a piston contained in a cylinder, comprising:
    (a) a base plate carrying said motor;
    (b) a manifold member having a planar surface where said manifold member is so mounted to said base plate to permit said planar surface to be located at a pre-determined distance form said base plate and in fixed spatial relationship therewith, said manifold member having a pressure conduit therein in continuous fluid communication with said pump and said planar surface1 said manifold member further having a first exhaust conduit and a second exhaust conduit for exhausting fluid to the atmosphere where said first and second exhaust conduits communicate with said planar surface, said planar surface having a distribution port in continuous fluid communication with said pressure conduit, said planar surface further having a first exhaust port communicating with said first exhaust conduit and a second exhaust port communicating with said second exhaust conduit; said manifold member further having a first cylinder port and a second cylinder port radially opposite and equally spaced from said distribution port to permit flow of said fluid medium to said cylinder when said first or second cylinder port is in fluid communication with said distribution port and to permit said fluid medium to exhaust from said cylinder when said first or second cylinder port is not in fluid communication with said distribution port;
    (c) a cavitated disk having an upper surface, a lower surface and an axis of rotation carried by said motor shaft in fixed rotational relationship therewith, where said lower surface is substantially parallel to said planar surface and displaced a predetermined distance therefrom, said cavitated disk further having an open first void cavity region disposed in said lower surface, said open first void cavity region having the shape of a sector of a circle where said axis of rotation and the center of said sector of a circle are substantially collinear, and where said distribution port is positioned adjacent said center of said sector of a circle and surrounded by said open first void cavity region thereby permitting continuous flow of said fluid medium into said open first void cavity region during rotation of said cavitated disk, and where said sector of a circle is so dimensioned and proportioned to permit continuous flow of said fluid medium through said distribution port and into said open first void cavity region during rotation of said motor shaft and to permit said first cylinder port and said second cylinder port to alternately be in fluid communication with said open first void cavity region during each revolution of said motor shaft; said cavitated disk having an open second void cavity region disposed in said lower surface where said open second void cavity region is so proportioned and dimensioned to permit fluid communication between said first cylinder port and said first exhaust conduit when said second cylinder port is in fluid communication with said distribution port and to permit fluid communication between said second cylinder port and said second exhaust conduit when said first cylinder port is in communication with said distribution port.

11. The motor driven rotary valve device recited in claim 10 wherein said upper surface contains a cavity therein so dimensioned and proportioned to dynamically balance said cavitated disk.

12. The motor driven rotary valve device recited in claim 10 wherein said lower surface and said planar surface are sufficiently adjacent surfaces to permit said lower surface to be in a bearing relationship with said fluid during rotation of said cavitated disk.

13. The motor driven rotary valve device recited in claim 10 wherein said cavitated disk is made of a lightweight material.

14. The motor driven rotary valve device recited in claim 13 wherein said lightweight material is aluminum.

* * * * *